US007675019B2

(12) United States Patent  
Birk et al.

(10) Patent No.: US 7,675,019 B2  
(45) Date of Patent: *Mar. 9, 2010

(54) METHOD AND DEVICE FOR ADJUSTING AT LEAST ONE LIGHT BEAM IN AN OPTICAL SYSTEM

(75) Inventors: Holger Birk, Meckesheim (DE); Johan Engelhardt, Bad Schoenborn (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1498 days.

This patent is subject to a terminal disclaimer.

(21) Appl. No.: 10/098,016

(22) Filed: Mar. 13, 2002

(65) Prior Publication Data

US 2002/0162976 A1 Nov. 7, 2002

(30) Foreign Application Priority Data

Mar. 13, 2001 (DE) ................................ 101 11 825

(51) Int. Cl.  
*H01J 3/14* (2006.01)  
*G02B 21/06* (2006.01)

(52) U.S. Cl. ....................................... 250/216; 359/388

(58) Field of Classification Search ................. 250/548, 250/201.1–201.3, 216; 359/896, 196, 385, 359/388; 369/44.11, 44.14, 44.22, 44.32; 356/121, 153, 149, 249, 138, 399–400  
See application file for complete search history.

(56) References Cited

U.S. PATENT DOCUMENTS

| | | | | |
|---|---|---|---|---|
| 4,627,725 | A * | 12/1986 | Nishio et al. | 356/152.2 |
| 4,889,425 | A * | 12/1989 | Edwards et al. | 356/141.3 |
| 5,206,766 | A |  4/1993 | Bassett et al. | 359/896 |
| 5,717,666 | A |  2/1998 | Park | 369/44.11 |
| 6,137,568 | A * | 10/2000 | Ohtomo et al. | 356/149 |
| 2002/0101581 | A1* |  8/2002 | Murakawa et al. | 356/138 |

* cited by examiner

*Primary Examiner*—Thanh X Luu  
(74) *Attorney, Agent, or Firm*—Houston Eliseeva LLP

(57) ABSTRACT

A device (70) is disclosed for adjusting a light beam (1) in an optical system (100), whereby the optical system (100) defines an optical axis (60). The device (70) for adjusting comprises means for coupling-in (3) of the light beam into a housing part (80) of the device (70). The means for coupling-in (3) determines a coupling-in point (3a) and a coupled in light beam (9). At least a first and a second photo detector (10, 22) are arranged in different in distances to the coupling-in point. (3a). In the coupled in light beam (9) at least one beam splitter (36) is provided, which directs the coupled in light beam (9) on at least one of the photo detectors (10, 22).

7 Claims, 6 Drawing Sheets

METHOD AND DEVICE FOR ADJUSTING AT LEAST ONE LIGHT BEAM IN AN OPTICAL SYSTEM

CROSS REFERENCE TO RELATED APPLICATIONS

This invention claims priority from the German patent application 101 11 825.2 filed on Mar. 13, 2001 which is incorporated by reference herein.

FIELD OF THE INVENTION

The invention concerns a method and device for adjusting a light beam in an optical system.

BACKGROUND OF THE INVENTION

The propagation of a light beam can be described adequately by four characteristic parameters, that is by the spatial offset of the light beam from the optical axis of the optical system, characterised by two coordinates which come out by a parallel shift of the light beam to the optical axis in a plane perpendicular to the optical axis, the angle under which the light beam itself or a line laid through the light beam cuts the optical axis after the parallel shift (elimination of the offset), as well an angle which describes the spatial position of the plane, with respect to a fixed coordinate system, which is defined by two lines each of which running through the light beam and the optical axis.

In the U.S. Pat. No. 5,206,766 a method and a device is disclosed which is used for the adjustment of a laser diode in an optical scanner. For the exact adjustment, in front of the scanner an opaque disc with an aim mark is installed. The exact adjustment of the laser diode is achieved when the laser beam meets the aim mark The U.S. Pat. No. 5,717,666 shows an adjustment apparatus for an optical means, to determine and equalise the offset between the central axis of a lens and the optical axis of a laser beam. The apparatus discloses a first and a second photo detector. The first photo detector is movable along the central axis of the lens to thus determine the offset. With the second photo detector the distribution of the laser beam is determined. Further, a beam splitter is provided which directs the laser beam onto both photo detectors. A mechanism moves the laser light source on the basis of the signals obtained from both photo detectors to adjust the laser light source accordingly.

SUMMARY OF THE INVENTION

It is the object of the present invention to provide a method with which the beam path in an optical system can be adjusted in a simple manner.

The above object is solved by a method, which comprises the following steps:

coupling-in a light beam of the optical system at a coupling-in point into a device for adjusting the light beam and thereby generating a coupled in light beam in the device;

directing the coupled in light beam to at least two photo detectors wherein each of the photo detectors is spaced differently from the coupling-in point of the coupled in light beam;

determining the deviation of the coupled in light beam from the nominal position out of the electrical signals of the photo detectors; and adjusting of at least one optical element of the optical system, for bringing the coupled in light beam into a nominal position.

Another object of the invention is to provide a device which permits in a simple, fast and safe manner the adjustment of a light beam in an optical system.

The object is solved by a device for adjusting a light beam in an optical system which defines an optical axis, comprising:

means for coupling-in the light beam into a housing part of the device;

a coupling-in point and a coupled in light beam being defined by the means for coupling-in;

at least a first and a second photo detector being provided in different distances from the coupling-in point; and at least one beam splitter being arranged in the coupled in light beam which directs the coupled in light beam to the at least one photo detector.

This has the advantage that especially in the optical device construction the characteristic beam parameters are measured in the optical system at least at one position of a beam path. On the basis of this measurement certain optical elements can be changed in the optical system in its position by set elements in order to change the spatial position of the light beam in the optical system so, that the light beam is brought into the nominal position. The required nominal position of the light beam coincides with the optical axis defined by the optical system.

The device according to the invention can be mounted at each place of the optical system and microscope, respectively. The device can be mounted in two different ways at the optical system. The first possibility is that the light beam of the optical system arrives directly and without deviation in the device. The device is mounted directly by a corresponding fixation at a coupling-in point in the beam path of the optical system. The device is equipped with means for coupling in by which a coupled in light beam is generated which reaches the device without angle change. The means for coupling-in is, for example, a lens or a beam extenuator (grey filter). The second possibility is that the light beam of the optical system arrives in the device with a deflection (with angle change) thereby defining the coupled-in light beam in the device. At the coupling-in point, the light beam arrives by means of a beam splitter or a conventional mirror in the device.

The minimal requirement for the device is that at least a first and a second photo detector are arranged at different distances to the coupling-in point. Preferably, the photo detectors are configured as 2-dimensional, position-sensitive detectors. In the device, at least one redirection means is provided which directs the coupled-in light beam onto the first photo detector. The portion of the coupled-in light beam passing the redirection means arrives on the second photo detector. At or in the device the photo detectors can be mounted differently. The only requirement for mounting the photo detectors is, that the photo detectors are located in respectively different distances to the coupling-in point. In a further embodiment of the invention, aim marks are provided in addition to the photo detectors. The aim marks are an additional visual control for the user with respect to the quality of the adjustment. For the adjustment, it is however sufficient to rely exclusively on photo sensors. Especially advantageous for determining the position of the light beam are electro-optical sensors, e.g. quadrant diodes or PSDs (Position Sensitive Detector). PSDs are used preferably, because quadrant diodes allow a position determination only within an area corresponding approximately to the light beam cross-section. The functionality of PSDs is well known to a skilled person, so a further explanation is not required. By reading the photo currents at the four electrodes, the place where the light beam hits within the photo sensor can be derived.

BRIEF DESCRIPTION OF THE DRAWINGS

The drawing is a schematic representation of the present invention an is explained more detailed below. The figures show in detail.

DETAILED DESCRIPTION OF THE INVENTION

Figure 1:
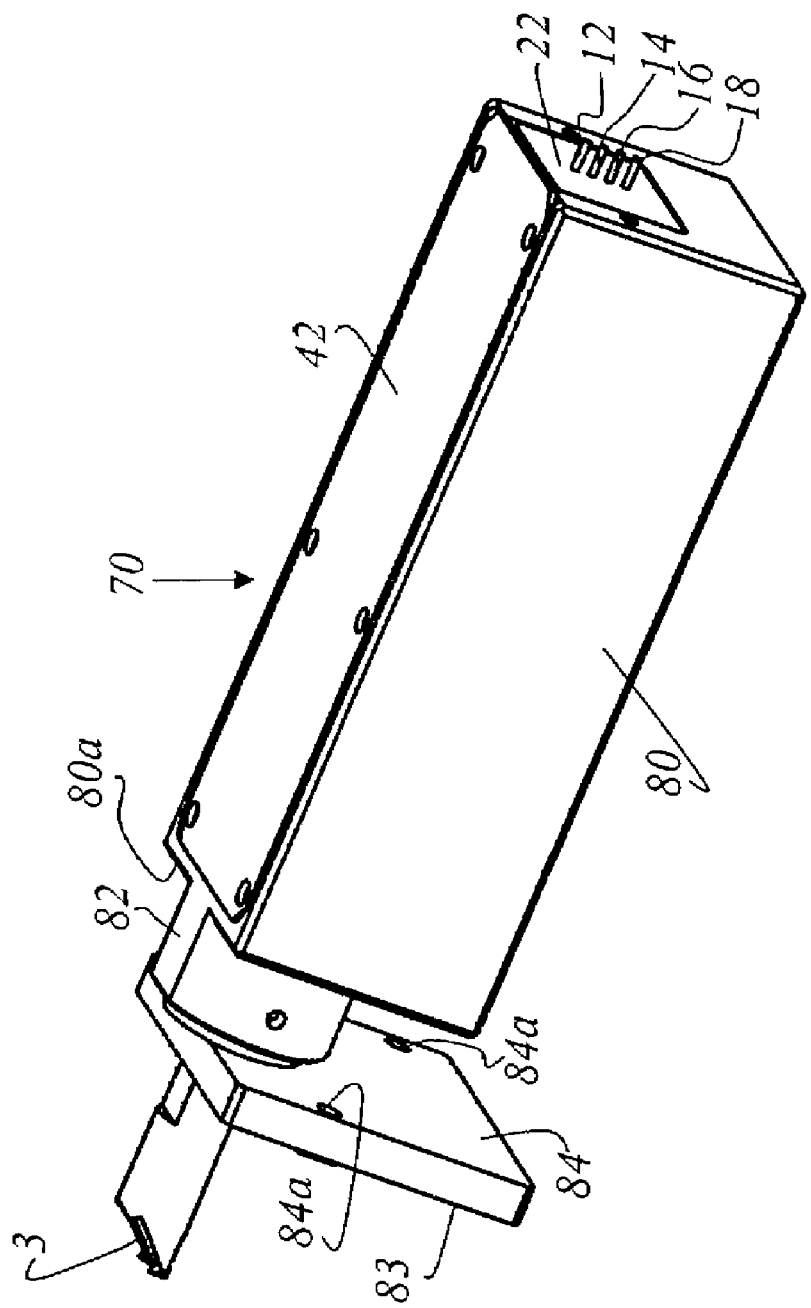
FIG. 1: a perspective view of the inventive device.

A device 70 for adjusting the light beam 1 in an optical system 100 is shown in a perspective view in FIG. 1. The device 70 has a housing part 80, which is closed with a cover 42. On the outside of the housing part 80 at least two photo detectors 10 (in this view hidden by the housing part 80) and 22 are mounted. At a front side 80*a* of the housing part 80 a flange 82 is formed, with which an element 83 cooperates. The element 83 in the embodiment shown here is a means for coupling-in 3 a light beam. The means for coupling-in 3 may be configured as a conventional mirror. The element 83 itself comprises a plate 84, which is configured for mounting the element 83 to the optical system 100. By mounting positions or borings 84*a* in the plate 84 an exact positioning of the device 70 with respect to the optical system 100 is achieved, since the element 83 cooperates with the flange 82 of the housing part 80. The exact positioning of the device 70 is of enormous importance for the exact adjustment of light beam 1 in the optical system. The photo detector 22 has several electrical connections 12, 14, 16 and 18, which are connected to means for handling the electric signals.

Figure 2:
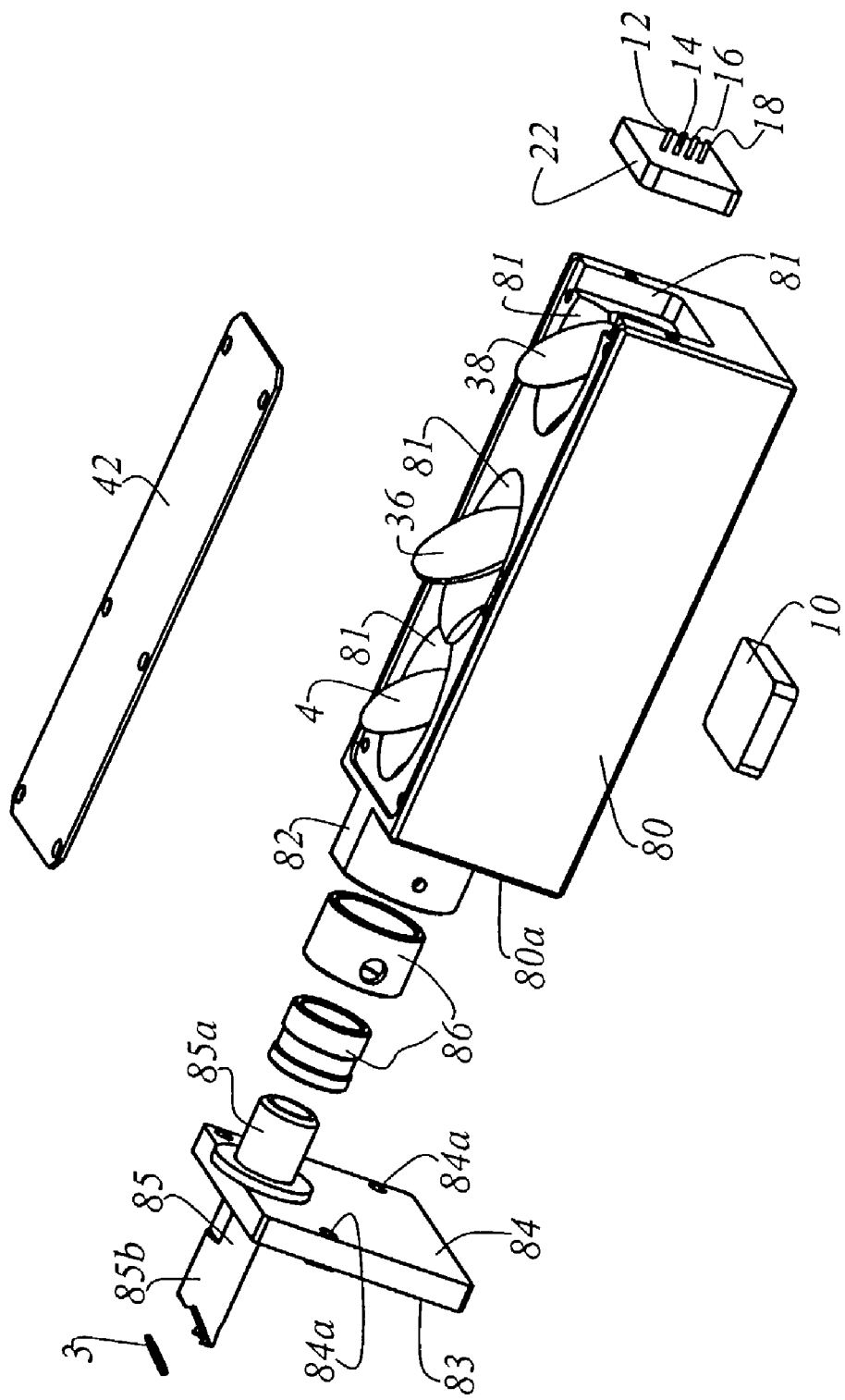
FIG. 2: a perspective view of an embodiment of the inventive device in an exploded view.

In FIG. 2 the device 70 (see FIG. 1) for adjusting is shown in a perspective view. The cover 42 is removed to provide an insight into the housing part 80. The housing part 80 has several milled inner holding elements 81. The housing part 80 is made of metal, for example steel or aluminium, in which the holding elements 81 and/or openings are formed. It is also possible that the housing part 80 is made from a polymer. In this case the housing part 80 can be manufactured for example by an injection moulding process. In the embodiment shown here three holding elements 81 are formed. Into each of the holding elements 81 beam splitters 4, 36 and 38 are assigned, whereby in the simplest case the beam splitters 4 and 38 consist of simple glass plates and the beam splitter 36 is designed as a 50/50 beam splitter. At the front side 80*a* of the housing part 80, as already in FIG. 1 described, the flange 82 is formed, with which the element 83 cooperates and encompasses the means for coupling-in 3 of the light beam 1. The plate 84 of the element 83 serves for the attachment at the optical system 100. Through the plate 84 a pipe 85 is led, which intervenes at a first end 85*a* with the opening (not represented) of the flange 82. At a second end 85*b* the pipe 85, under an angle tapered, carries the means for coupling-in 3, which directs the light beam from the optical system 100 into housing part 80 of the device 70. Over at least one coupling element 86 the element 83 is connected with the flange 82 of the housing part 80.

Figure 3:
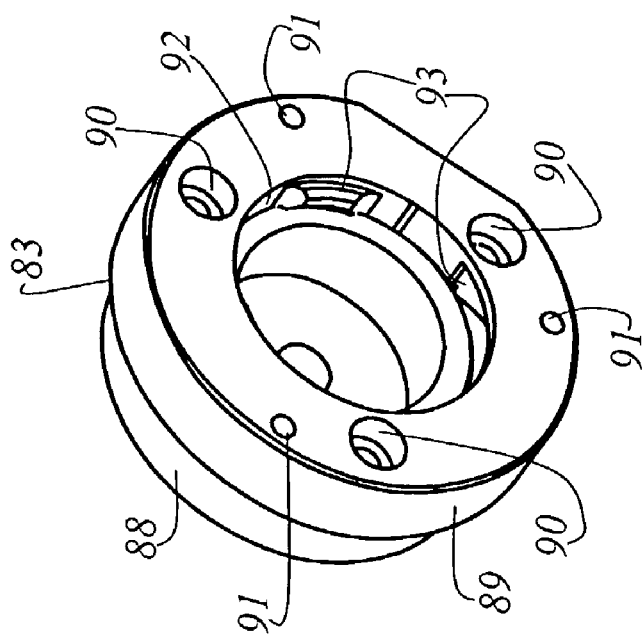
FIG. 3: a perspective view of an embodiment of a part for mounting the device to the optical system.

FIG. 3 shows a further embodiment of an element 83 for mounting the device 70 to optical system 100. The element 83 as shown in FIG. 3 is suitable in a way for the attachment of the device 70 in the beam path of the optical system 100, so that the light beam 1 enters the device 70 from the optical system 100 without any deflection. The element 83 is configured from a first and a second cylindrical element 88 and 89, wherein the first cylindrical element 88 has on one side a smaller diameter as on the other side. The second cylindrical element 89 serves as an adapter between the first cylindrical element 88 and the optical system 100. For this purpose several screwing openings 90 are provided at the second cylindrical element 89, with whose assistance the two cylindrical elements 88 and 89 are bolted together. Additionally, several engaging positions 91 are intended at the second cylindrical element 89, which cooperate in an appropriate way with the optical system 100. The first cylindrical element 88 possesses a smaller diameter at one of its sides than the second cylindrical element 89, in order to cooperate in a properly matching way with the flange 82 of the housing part 80 of the device 70. The inner side 92 of the second cylindrical element 89 is provided with a properly matching mounting mechanism 93 for the fast attachment of the device 70 to the optical system 100. Furthermore, the first cylindrical element 88 possesses a centric opening 94, through which the light beam 1 from the optical system 100 enters without an angle change the device 70.

Figure 4:
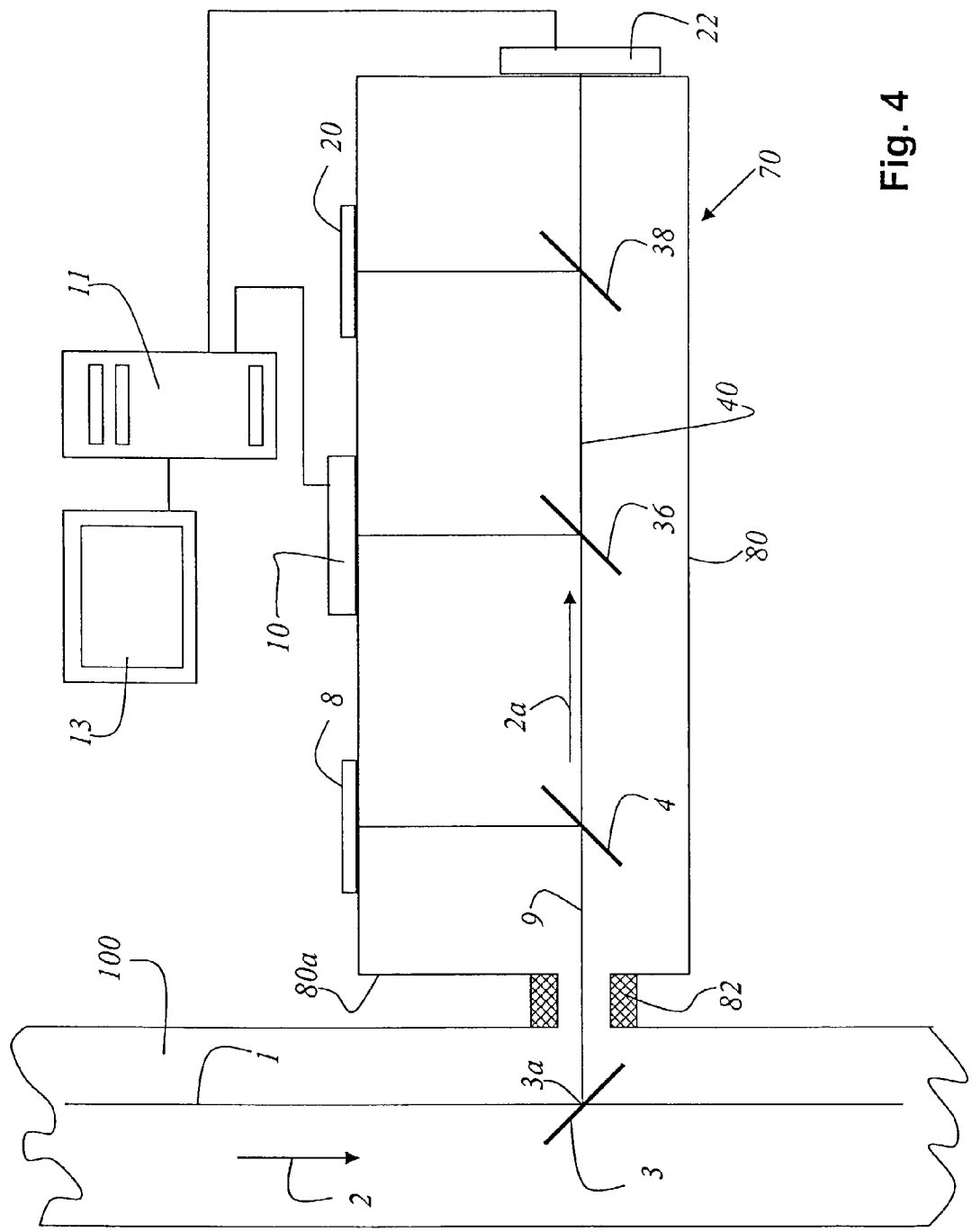
FIG. 4: a schematic view of the inner design of the device.

FIG. 4 shows an embodiment of the device, which enables not only an electronic determination and reading of the position signals, but also a visual control. The schematic representation in FIG. 4 is the 2-dimensional representation of the embodiment as shown in FIG. 2. The light beam 1, which propagates the optical system 100 in the direction as indicated by the arrow 2, is reflected with a means for coupling-in 3 into the device 70. The means for coupling-in 3 can be configured as a conventional beam splitter, which is permanently arranged in the optical axis of the optical system 100. Likewise the means for coupling-in 3 can be in the form of a conventional mirror, which is brought only for determining the adjustment of the light beam 1 into the optical system 100, such that the light beam 1 is coupled into the device 70. The means for coupling-in 3 defines a coupled in light beam 9, which is guidable beam splitters 4, 36, 38, provided in the device 70 on at least two photo detectors 10 and 22. A first beam splitter 4 directs the coupled in light beam 9 on a first visually observable aim mark 8. The first beam splitter 4 can be configured for example in the form of a simple glass plate. The coupled in light beam 9 defines an optical axis 40 for the propagation in a straight line within the housing part 80. A second beam splitter 36 directs the light beam, passing the first beam splitter 4, on a first photo detector 10, which is for example in the form of a 2-dimensional, position-sensitive detector. The second beam splitter 36 is for example a coated 50/50-beam splitter. A third beam splitter 38 directs the light beam, passing the second beam splitter 36, on a second visually observable aim mark 20. The third beam splitter 38 may be as well in the form of a simple glass plate. The light beam, passing the third beam splitter 38, arrives at a second photo detector 22, which can be likewise configured as a 2-dimensional, position-sensitive detector. The special arrangement of the aim marks 8, 20 and the photo detectors 10, 22, represented in FIG. 4, is only a selection of several possibilities. In the further description the light beam coupled out from the optical system is called a coupled in light beam 9. The only requirements are that at or in the housing part 80 at least two photo detectors 10, 22 are provided, that the photo detectors 10, 22 are arranged in different distances from the means for coupling-in 3, and that at least one photo detector 10 or 22 is spaced apart in the housing part from the optical axis 40 of the coupled in light beam 9. The spatial position of the means for coupling-in 3 defines a coupling-in point 3a. The photo detectors 10 and 22 possess several electrical connections, which are connected with a computer 11. The computer 11 is for example a PC or an integrated circuit, which executes the necessary calculations for the determination of the adjustment of the optical system 100. A display 13 is assigned to the computer 11 (see FIG. 4), on which for example the current position of the light beam, to be adjusted in the optical system 100, is graphically displayed. A special embodiment of the graphical representation on the display 13 is described below in FIG. 8. The first, second and third beam splitters 4, 36 and 38 as well as the second photo detector 22 are arranged in the direction of propagation of the coupled in light beam 9, or in the optical axis 40 of the coupled in light beam 9, whereby the direction of propagation is marked by an arrow 2a. The housing part 80 of the device 70 is connected at the front side 80a by the flange 82 with the optical system 100. The connection serves to bring the device 70 into a defined position with respect to the optical system 100.

Figure 5:
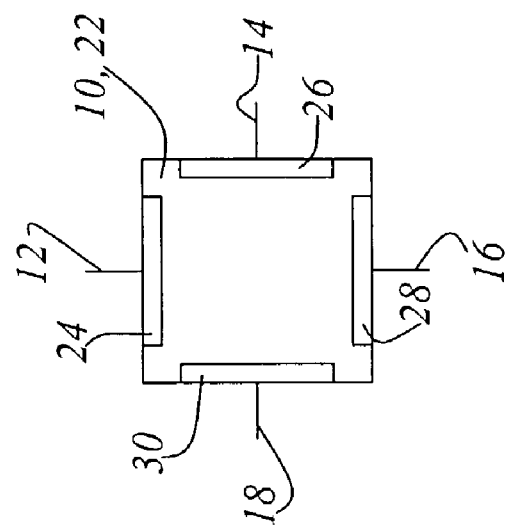
FIG. 5: a schematic view of the 2-dimensional position sensitive device used as the photo detector.

FIG. 5 shows a possible embodiment of the photo detectors 10 and 22 which are used as the 2-dimensional, position-sensitive sensors. The photo detector 10 or 22 is designed as a rectangle and possesses at everyone of the four sides an electrode 24, 26, 28 and 30. From the electrodes 24, 26, 28 and 30 in each case an electrical connection 12, 14, 16 and 18 proceeds. The electrical links 12, 14, 16 and 18 are, as described already above, for the calculation of the place of impact of the light beam on the photo detector 10 or 22 connected with the computer 11. The place of impact of the a coupled in light beam 1 on the photo detector 10 or 22 is determined by measurement of the light currents over the electrodes 24, 26, 28 and 30. The calculation takes the optical distances of the photo detectors 10 and 22 to the beam splitter 36 into account.

Figure 6:
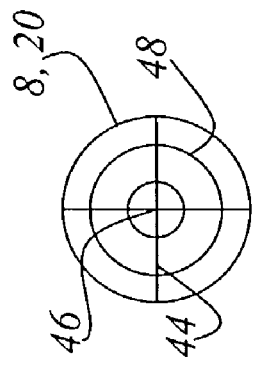
FIG. 6: a schematic view of the aim mark.

FIG. 6 shows an embodiment of the aim marks 8 and 20. The aim marks 8 and 20 are made for example in the form of a circular matt screen. On the aim mark 8, 20 a cross hair 44 is applied with the crossing in the centre 46. Around the crossing at least one circle 48 is formed.

Figure 7:
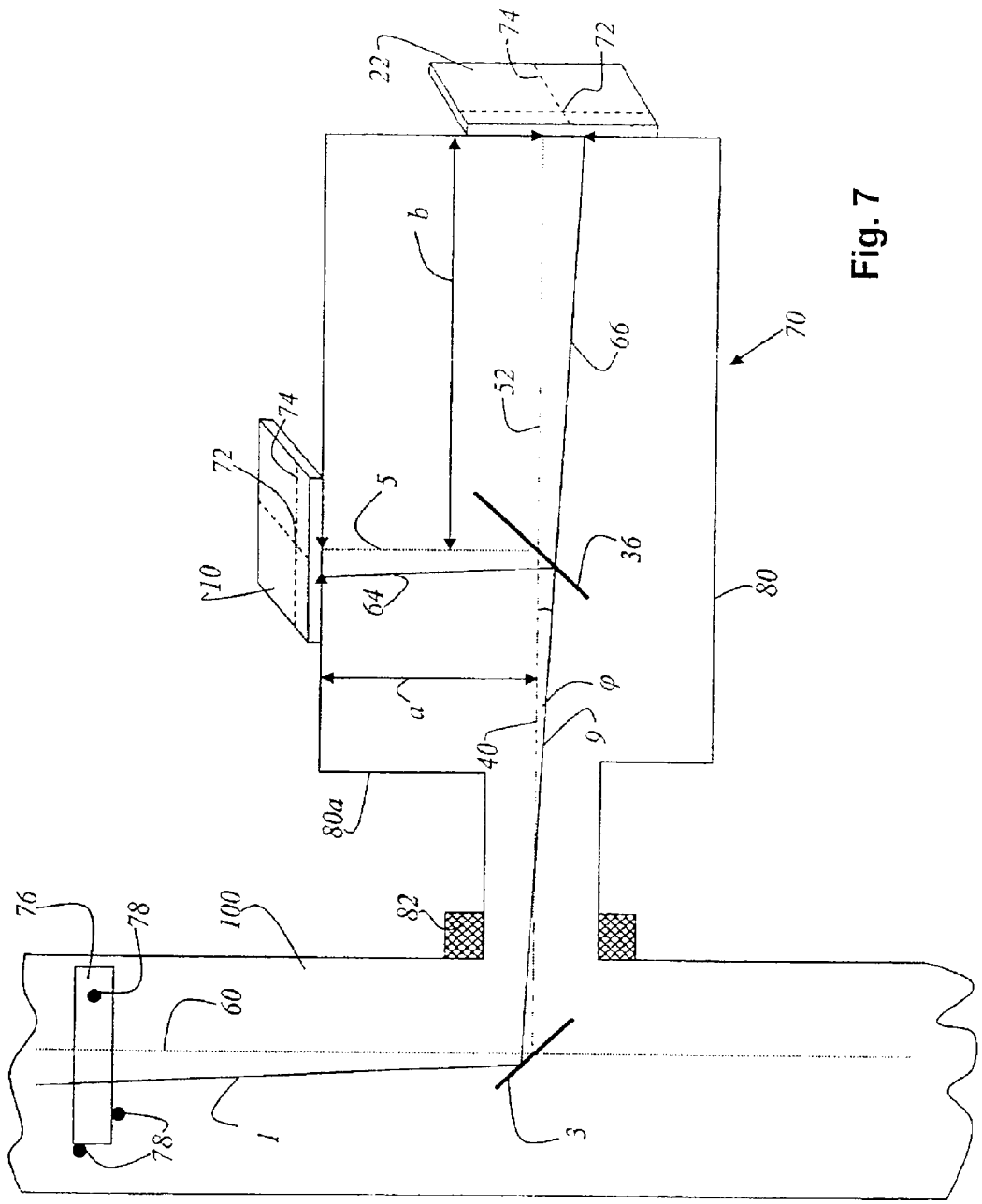
FIG. 7: an overview of the distances which are relevant for the calculation of the characteristic beam parameters.

FIG. 7 shows an outline of the distances and angles in the device 70, on which basis the calculation of the characteristic beam parameters can be made. The device 70, shown in the schematic representation of FIG. 7, is equipped with two photo detectors 10, 22, which are used for the determination of the adjustment of the optical system 100. The use of aim marks is in this embodiment not necessary.

The light beam 1 in the optical system 100 is represented in FIG. 7 as a solid line. The coupled in light beam 9 is as well represented as a solid line in the device 70. The optical axis 60 of the optical system 100 is shown as a broken line. The path of an ideally adjusted light beam exists, when light beam 1 is exactly on the optical axis 60 of the optical system 100 and is guided accordingly into the housing part 80 by the means for coupling-in 3. The deviation of the deviation of the light beam 1 from optical axis 60 of the optical system 100 then can be designated as a spacial parallel shift and tilt of the light beam 1. The parallel shift and the tilt can be determined at the places of impact 124 and 125 of the coupled-in light beam 9 on the first and second photo detector 10 and 22. A coupled in light beam 9, which is exactly on the optical axis 40 of the device 70, defines on the first and second photo detector 10 and 22 in each case a nominal position 72, which determines an origin of a 2-dimensional coordinate system 74. The coordinate system 74 is represented in broken lines. If the coupled in light beam 9 is in the nominal position 72, the optical system 100 is exactly adjusted. If the light beam 1 is not ideally adjusted in the optical system 100, then this meets in each case the two photo detectors 10 and 22 at a position which is apart from the nominal position 72.

This misalignment can for everyone of the two photo detectors 10 and 22 be described with a pair of coordinates. On the first photo detector 10 the misalignment is defined by a pair of coordinates $(x_1, y_1)$. On the second photo detector 22 the misalignment is defined by a pair of coordinates $(x_2, y_2)$. The pairs of coordinates or the places of impact on the photo detectors 10 and 22 are determined with the computer 111 from the electrical signals of the photo detectors 10 and 22.

Within the housing part 80, the coupled-in light beam 9 may be shifted parallel and/or spatially tilted to the optical axis 40 of the coupled-in light beam 9. The spatial inclination can unambiguously be described by two angles φ and θ. The calculation of the distance of the light beam 1 to the optical axis 60 in the area of the means for coupling-in 3 results out of a simple triangle calculation. The distance of the ideally adjusted light beam 5 from the beam splitter 36 to the first photo detector 10 is designated a and the distance of the ideal adjusted light beam 52, emanating from the beam splitter 36, to the second photo detector 22 on the optical axis 40 is designated b. Using the first coordinates $(x_1, y_1)$ the distance of the partial light beam 64 to the ideal adjusted light beam 50 can be determined at the first photo detector 10. With the second coordinates $(x_2, y_2)$ the distance of the partial light beam 66 to the ideal adjusted light beam 52 can be determined at the second photo detector 22. The distances a and b are determined by the size of the housing part 80. The coordinates $(x_1, y_1)$ and $(x_2, y_2)$ are determined from the data generated by the first and second photo detector 10 and 22. The angle φ represents the angle by which the optical axis 40 intersects the coupled-in light beam 9 or a line defined by the coupled-in light beam 9 after parallel shift (elimination of the offset). The angle φ is calculated according to the following equation:

$$\varphi = \arctan\left(\frac{\sqrt{(x_2-x_1)^2+(y_2-y_1)^2}}{b-a}\right)$$

The angle θ, also after elimination of the offset, describes the spatial position of a plane in a fixed coordinate system which is defined by two lines each of them passing through the coupled-in light beam 9 and the optical axis 40. The angle θ is calculated as follows:

$$\theta = \arctan\left(\frac{x_1-x_2}{y_2-y_1}\right)+90°, \quad \text{for} \quad y_2-y_1 \geq 0$$

$$\theta = \arctan\left(\frac{x_1-x_2}{y_2-y_1}\right)+270°, \quad \text{for} \quad y_2-y_1 < 0$$

The light beam 1 in the optical system 100 passes at least one optical element 76. This optical element 76 is adjustable so that the light beam 1 in the optical system 100 lies exactly in the optical axis 60. As a consequence of this adjustment, the coupled-in light beam 9 hits exactly a nominal position 72 in the device 70. The adjustment of the optical element 76 is carried out by several set elements 78 whereby the light beam 1 is manipulated in four different and independent directions, two lateral and two angle adjustments, in order to bring the light beam 1 into line with the optical axis 60.

Figure 8:
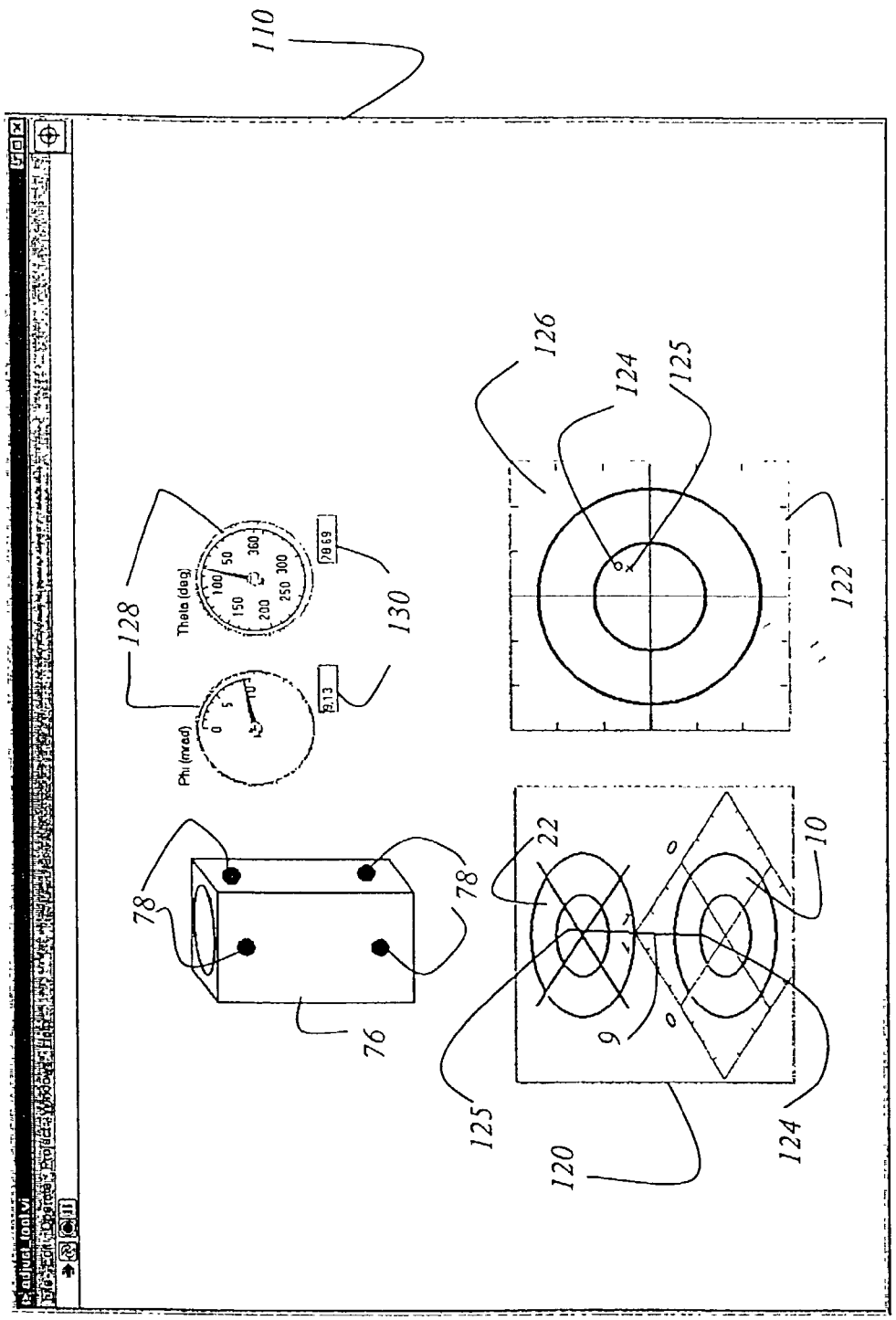
FIG. 8: an embodiment of the visual representation of the deviation of the actual position from the nominal position on the display of an user-interface.

FIG. 8 shows an embodiment of an user-interface 110 for the visual representation of the deviation of the actual position of the coupled-in light beam 9 from the nominal position on the display 13. The actual position with respect to the optical axis 40 is unambiguously characterized by parallel offset to the optical axis 40 and/or inclination to the optical axis 40. Shown is a spatial view 120 of the beam path of the coupled in light beam 9 between both photo detectors 10 and 22. Furthermore, a projection view 122 is shown, on which the places of impact 124 and 125 on both photo detectors 10 and 22 of the coupled-in light beam 9 is shown on a schematic representation of the photo detector surface 126. Additionally, the angles $\phi$ and $\theta$ are shown not only in a graphical angle display 128 but also in a numerical angle display 130 on the user-interface 110. Furthermore on the user-interface 110, an image of the optical element 76 is arranged, whereby it is indicated to the user which set elements 78 must be actuated in order to bring the light beam 1 into the nominal position 72. All display, views and statements run online in real time.

What is claimed is:

1. Method for adjusting of at least one light beam in an optical system defining a beam path, the method comprising the following steps:
   coupling-in a light beam of the optical system at a coupling-in point into a device for adjusting the light beam and thereby generating a coupled in light beam in the device, the device defining an optical axis;
   directing the coupled in light beam to at least two photo detectors wherein each of the photo detectors is mounted on a housing part of the device and disposed apart from the beam path at different distances from the coupling-in point of the coupled in light beam;
   determining the deviation of the coupled in light beam from a nominal position by means of the electrical signals of at least two photo detectors; and
   adjusting at least one optical element of the optical system to bring the coupled in light beam into the nominal position, therefore adjusting the light beam to propagate along the beam path in the optical system, 2. The method as defined in claim 1, wherein adjusting at least one optical element is carried out with at least one set element allowing to change an angular and lateral position of the light beam.

3. The method as defined in claim 1, further comprising providing at least one optical aim mark to visualize and control the nominal position of the coupled in light beam.

4. The method as defined in claim 3, wherein at least two aim marks are provided and each of the aim marks is positioned at a different distance from the coupling-in point.

5. The method as defined in claim 1 comprising the further steps:
   determining a spatial position of the light beam in the optical system by directing the coupled in light beam to at least two photo detectors, which are configured as 2-dimensional position sensitive sensors, and
   calculating the position of the coupled in light beam relative to the optical axis from the places of impact of the coupled in light beam on the position sensitive sensors.

6. The method as defined in claim 5 comprising the further steps:
   displaying a deviation of the places of impact of the coupled in light beam, from the nominal position in graphical or numerical form on a display connected to a computer connected to the device for adjusting, and
   displaying the displacement of the places of impact of the coupled in light beam during the change of at least one set element.

7. The method as defined in claim 1, wherein the deviation of the places of impact from the nominal position of coupled in light beam on the first photo detector is determined by a first set of coordinates and on the second photo detector by a second set of coordinates.

* * * * *